Patented June 1, 1926.

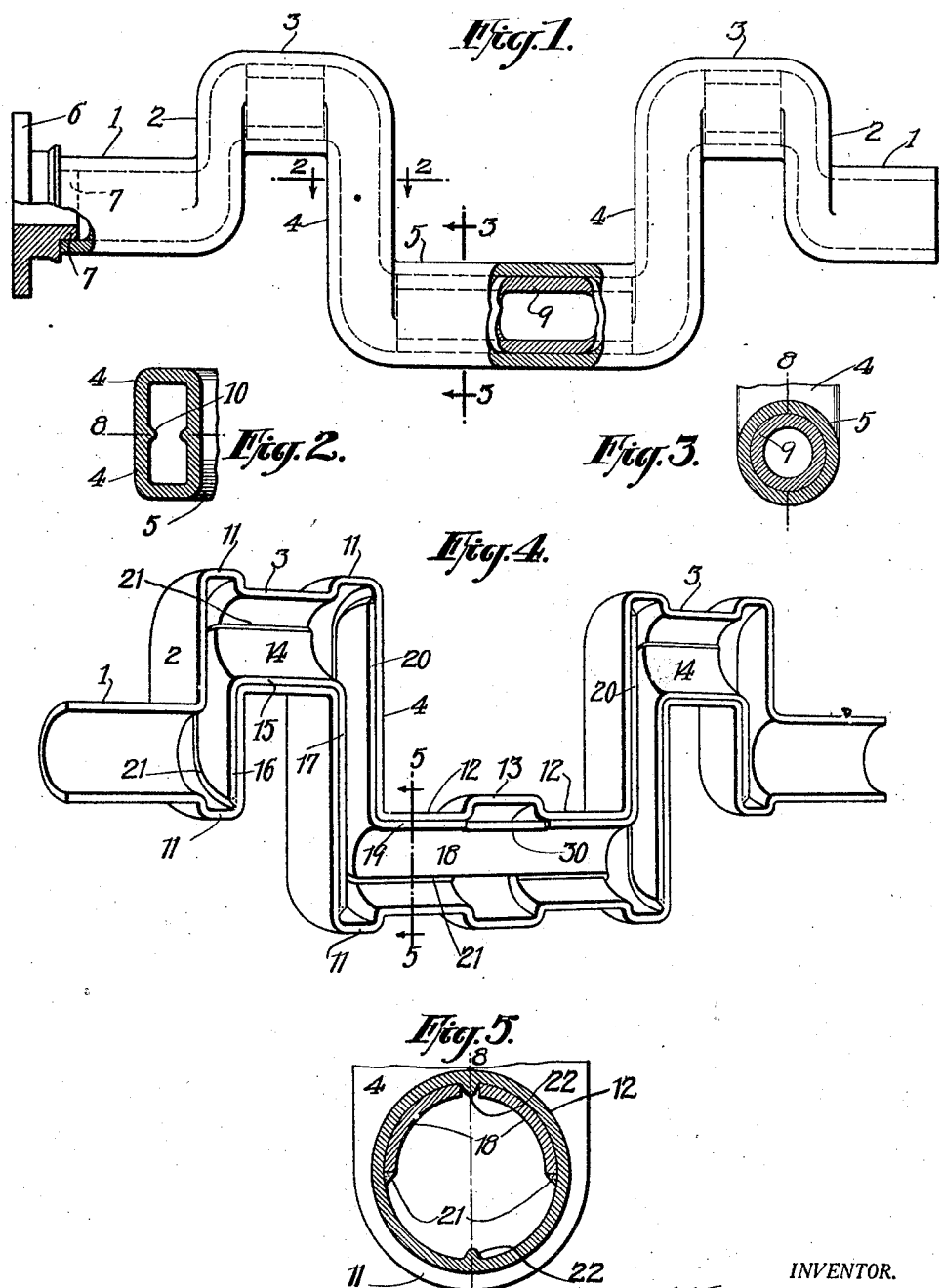

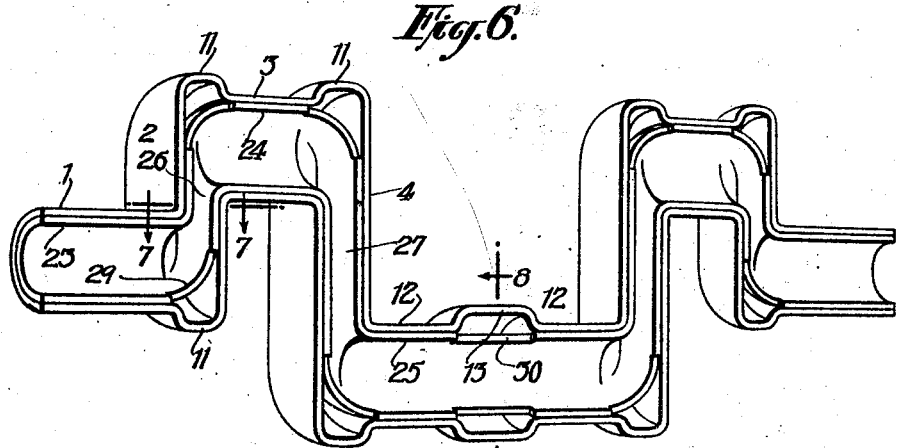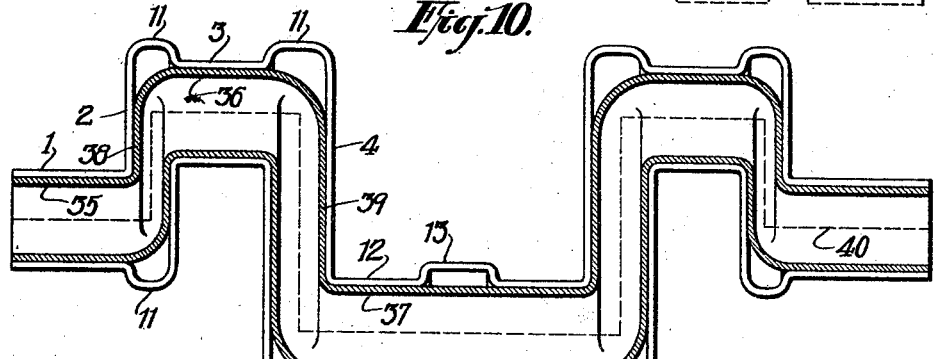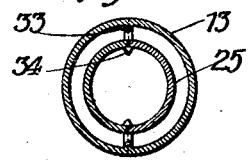

1,587,025

UNITED STATES PATENT OFFICE.

THOMAS E. MURRAY AND THOMAS E. MURRAY, JR., OF BROOKLYN, NEW YORK.

CRANK SHAFT AND METHOD OF MANUFACTURE.

Application filed January 25, 1924. Serial No. 688,405.

In a previous application No. 573,558, we have described and illustrated certain improvements in crank shafts, and methods of manufacture, for automobile motors and similar internal combustion engines and applicable also to other shafts having a portion or portions offset.

The present application is in part a division thereof and includes also certain modifications.

The accompanying drawings illustrate embodiments of the invention.

Fig. 1 is a side elevation, partly in section of a shaft;

Figs. 2 and 3 are sections of the same on the corresponding lines of Fig. 1;

Fig. 4 is a perspective view of a built-up segment used in making another shaft;

Fig. 5 is a cross-section of a shaft formed of two such segments; the plane of section being 5—5, Fig. 4;

Fig. 6 is a perspective of a segment similar to Fig. 4 with a different style of reinforcement;

Figs. 7 and 8 are cross-sections of a pair of such segments on the corresponding lines of Fig. 6;

Fig. 9 is a cross-section of the finished shaft on the line 8—8 of Fig. 6;

Fig. 10 is a side elevation of the segment of Fig. 6 with another style of reinforcement;

Figs. 11 and 12 are perspective views of segments of another style.

Referring to the embodiments of the invention illustrated, the shaft has axial end bearing portions 1 with short crank portions 2 connecting the end bearing portions with short offset bearing portions 3, each for a single connecting rod of the engine. From the portions 3, crank portions 4 connect with an offset central portion 5 of a length to accommodate the two central connecting rods. The bearing portions are circular in cross-section as shown in Fig. 3. The crank portions, however, are preferably oblong in cross-section as shown at Fig. 2 with their shorter sides extending lengthwise of the shaft, and their longer sides extending crosswise. On one or both ends of the shaft there is an end flange 6 for coupling it to the transmission or other part. For applying the flange it may be provided with a projecting portion 7 which is embraced between the two segments of the portion 1 of the shaft; so that the welding of these segments, as hereinafter described, will hold the flange firmly in place.

The shaft is hollow, the opening in the center preferably (though not necessarily) extending from end to end through the several crank portions and bearing portions. The making of the shaft hollow has substantial advantages. It is easier to keep cool. It can be made lighter, for the same strength, than the common forged steel shafts. Counterbalancing weights of lead or other heavy material can be placed inside the shaft. It can be easily lubricated by means of holes through the bearing portions conveying to the surface a portion of the oil circulated inside of the shaft. The hollow construction also permits reinforcement on the inside, leaving the external dimensions the same, which is particularly important for the bearing portions. This matter of reinforcement is very important and we have illustrated several different methods of reinforcing.

The present invention provides also a very economical method of manufacture from sheet metal bent to form segments and welded together along their edges.

For the shaft of Fig. 1, segments are used, the edges of which are in the plane passing through the centers of the several bearing portions, this plane being indicated in Figs. 2 and 3 by the dotted lines 8. In longitudinal shape such segments will correspond with the elevation of the shaft in Fig. 1. The offset portions are bent transversely to the deep channel shapes of Fig. 2. The bearing portions are bent to circular segments, Fig. 3. The two complementary sections are then brought together with their edges abutting and welded along the edges.

The oblong cross-section of the arms, with its greater dimension transverse to the axis of the shaft, gives increased efficiency. The present method of construction permits of the shaping of the parts in this or other desired shape with the greatest efficiency.

Various methods of welding may be used as, for example, ordinary arc welding or acetylene flame welding. We prefer, however, to use the method of the Murray Reissue Patent No. 15,466 of October 10, 1922, in which, while the edges are pressed together, a current of extremely high ampere strength is applied for a very brief interval of time.

This method of manufacture also facilitates the strengthening of the shaft throughout its length or at desired points by various inside reinforcements. For example, reinforcing tubes 9 may be embraced between the segments of the bearing portion 5, and similar tubes within the other bearing portions.

A second method of reinforcement is indicated in Fig. 2. In the butt-welding of the two segments together, a certain excess of metal is extruded on the inside forming a rib 10 extending over any desired length. The welding operation can be so controlled as to regulate the quantity and location of this extruded metal. Thus the section will be of the normal gage of the sheet metal used throughout the principal parts of the periphery, with integral reinforcements of extra thickness at the joints.

Figs. 1, 2 and 3, illustrate the reinforcement of the crank portions by extruded ribs, and the bearing portions by separate reinforcing members embraced between the segments. But these two methods may be used conjointly throughout the length of the shaft or at desired points in the length.

In Fig. 4, we start with a segment corresponding to the longitudinal shape of the shaft; as in Fig. 1. The end bearing portions 1 and the portions 3 adjacent to the ends, and also the crank portions 2 and 4 are similar in cross-section to the corresponding parts of Fig. 1. But the segments of the crank portions are extended at their ends to form enlargements 11 of greater diameter than the bearing portions, thus stiffening the shafts at these weak points. The central bearing is formed in two parts 12 between which is located an enlargement 13 which serves a similar stiffening purpose. The width of the crank portions is also greater than the diameter of the axial portions. See Fig. 5.

For reinforcing this shaft we have illustrated separate reinforcing members fixed within the segments before the latter are welded together. There are reinforcing members for the bearings 3 and adjacent parts, and a separate reinforcing member for the bearings 12 and adjacent parts. The reinforcing members which are indicated as a whole at 14, are stamped from sheet metal with a portion 15 fitting the inner side of the bearing member 3, and portions 16 and 17 fitting the adjoining sides of the crank portions 2 and 4 of the shaft.

The reinforcing member 18 is likewise stamped out of sheet metal with a portion 19 extending along the insides of the shaft members 12 and with arms 20 extending along the sides of the crank members 4 which adjoin the ends of the central bearing portion of the shaft. These reinforcements are applied to the shaft segment and united thereto by arc weld deposited metal, as indicated at 21, or spot welding or other method of attaching may be used. It is important to their reinforcing value that they be united to the segments.

In cross-section the reinforcements may extend over any desired portion of the segments. We have illustrated them in Fig. 5 extending over about 90 degrees and thus reinforcing the inside portions of the angles where the bearing portions join the crank portions of the shaft, which are the points needing the greatest reinforcement.

Fig. 5 illustrates two such segments 12 with the reinforcements 18 applied thereto. When the edges of such segments are welded together, we have the complete shaft with inside reinforcements united thereto and extending around the several inside corners and along the lengths of the bearing members. In addition there is a reinforcement extending lengthwise and formed by a rib 22 extruded along the joints in the plane 8—8.

According to Fig. 6, segments are used similar to those of Fig. 4. The reinforcement, however, consists of a second segment extending continuously from end to end and having bearing portions 23, 24 and 25 united by crank portions 26 and 27. These may be more conveniently spot welded to the shaft segments proper, and we have indicated such spot welds diagrammatically at 28, in Fig. 7.

Where the reinforce is out of contact with the outside shell, as at the outer corners and at the center of the shaft, by reason of the enlargements 11 and 13, it is better to cut away the edges of the reinforce as indicated at 29 and 30, for a reason which is explained in connection with Fig. 8. This is a section showing an enlargement 13 at the center of the shaft, and the reinforcing segments 25 with the cut away edges 30. In welding, the parts are pressed between electrodes 31 and 32 and the welding current passed between the electrodes and across the edges. But the current cannot pass directly to the portions 25 of the reinforce which lie within the enlargements 13 of the outer shell. Therefore, the edges of the reinforce at this point cannot be softened as rapidly as desired and would interfere with the welding together of the edges of the enlargement 13, except for the removal of the metal at 30.

Fig. 9 shows the effect of the welding operation. The parts 13 are united at their edges with an integral (extruded) reinforcing rib 33. The segments 25 are brought close together but are not extruded, the rib 34 shown being extruded from the portions 25 of the reinforce which are embraced within the parts of the outer shell of smaller diameter.

In Fig. 10 again segments similar to that of Figs. 4 and 6 are used. The reinforce, however, is a shaft of tubing integral throughout its length as described in a copending application No. 686,513 of Thomas E. Murray, Jr. The reinforcing shaft is made with bearing portions 35, 36 and 37 connected by crank portions 38 and 39. It may be formed from seamless tubing or from ordinary tubing with a single welded longitudinal joint or from segments united by butt welding approximately or substantially along the dotted line 40. In welding together the segments of the outer shell to embrace this inner reinforcing tube, the segments must be provided with an extra width of metal, or take-up, along their edges such as will allow them, after the edges are softened by the passage of the current, to come together in a close embrace around the reinforce simultaneously with their welding. The extruded metal in this case will form ribs on the outside. Generally such outside ribs would be objectionable and would be removed by grinding or cutting them off. The same procedure would be adopted in making any of the shafts of this application; that is, any extruded metal on the outside would be removed.

Figs. 11 and 12 show segments producing a shaft similar in outside contour to that produced by the segments of Figs. 4, 6 and 10. But the segments themselves are of different shape and are not identical, but are complementary to each other. The welded edges of the bearing portions 41, 41ª, 42, 42ª, 43, 43ª are in planes transverse to the common plane passing through the centers of all the bearings. The edges of the crank portions 44, 44ª and 45, 45ª are in planes transverse to the axis of the shaft. These segments may be used to embrace inside reinforcements and may be united with extrusion of integral ribs on the inside similarly to the segments of the previous figures.

The invention is applicable not only to the making of crank shafts and cam shafts and other articles having similar shapes, but is applicable also in part at least to the making of various other articles. And when we speak of crank shafts it is to be understood that such shafts may be made with one or more bearing portions and with one or more crank portions, and that the annular relation of the latter and the number and relation of the axial bearings and of the offset bearings may be greatly varied.

Though we have described with great particularity certain embodiments of our invention, yet it is not to be understood therefrom that the invention is restricted to the particular embodiments disclosed. Various modifications thereof may be made by those skilled in the art without departing from the invention as defined in the following claims.

What we claim is:

1. A shaft with crank portions, said shaft being made of sheet metal segments bent transversely and united along longitudinal edges and a longitudinal reinforcing member within said segments and an additional reinforcement comprising metal integral with the metal of said segments.

2. A shaft with crank portions, said shaft being made of sheet metal segments bent transversely and united along longitudinal edges and a longitudinal reinforcing member within said segments and an additional reinforcement comprising metal integral with the metal of said segments, said metal being extruded on the line of junction of the segments.

3. A shaft with crank portions, said shaft being made of sheet metal segments bent transversely and welded along longitudinal edges, and a longitudinal reinforcing member within said segments, the latter engaging the reinforcement along the bearing portions of the shaft and being enlarged beyond the outer face of the reinforcement at intermediate points.

4. A crank shaft having a bearing portion, a crank portion, and a reinforcement extending continuously over both said portions, said shaft being made of segments welded together and said reinforcement being welded to the shaft.

5. The method of making a reinforced shaft with crank portions which consists in bending up sheet metal to form segments bent transversely, embracing a reinforcing member between said segments and uniting said segments along longitudinal edges.

6. The method of making a reinforced shaft with crank portions which consists in bending up sheet metal to form segments bent transversely, embracing a reinforcing member between said segments and uniting said segments along longitudinal edges and at the same time extruding a portion of the metal to form a reinforcing rib along the joint.

In witness whereof, we have hereunto signed our names.

THOMAS E. MURRAY,
THOMAS E. MURRAY, Jr.